United States Patent
Takii

(10) Patent No.: US 10,526,016 B2
(45) Date of Patent: Jan. 7, 2020

(54) VEHICLE FRONT SECTION STRUCTURE

(71) Applicant: TOYOTA JIDOSHA KABUSHIKI KAISHA, Toyota-shi, Aichi-ken (JP)

(72) Inventor: Shunsuke Takii, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 15/942,808

(22) Filed: Apr. 2, 2018

(65) Prior Publication Data
US 2018/0339732 A1 Nov. 29, 2018

(30) Foreign Application Priority Data
May 26, 2017 (JP) .................................. 2017-104789

(51) Int. Cl.
  *B62D 21/15* (2006.01)
  *B62D 27/02* (2006.01)
  *B62D 21/02* (2006.01)
  *B62D 25/08* (2006.01)
  *B62D 29/00* (2006.01)

(52) U.S. Cl.
  CPC .......... *B62D 21/152* (2013.01); *B62D 21/02* (2013.01); *B62D 25/08* (2013.01); *B62D 27/023* (2013.01); *B62D 29/008* (2013.01)

(58) Field of Classification Search
  CPC ...... B62D 21/02; B62D 21/11; B62D 21/152; B62D 25/08; B62D 25/082; B62D 27/023; B62D 29/008
  USPC ............ 296/29, 197.09, 193.09, 203.02, 205
  See application file for complete search history.

(56) References Cited

U.S. PATENT DOCUMENTS

| 8,764,104 | B2 * | 7/2014 | Kihara | .................... | B60R 19/34 |
| | | | | | 293/155 |
| 9,643,651 | B2 * | 5/2017 | Dressel | .................. | B62D 21/11 |
| 9,751,565 | B2 * | 9/2017 | Tatsuwaki | ............ | B62D 21/155 |
| 9,764,705 | B2 * | 9/2017 | Murata | .................... | B60R 19/34 |
| 2017/0029039 | A1 | 2/2017 | Kurokawa | | |

FOREIGN PATENT DOCUMENTS

| JP | 2013-193637 A | | 9/2013 | | |
| JP | 2016088113 A | * | 5/2016 | ............. | B60R 19/34 |
| JP | 5958706 B2 | | 8/2016 | | |
| JP | 2017-030540 A | | 2/2017 | | |

* cited by examiner

*Primary Examiner* — Jason S Daniels
(74) *Attorney, Agent, or Firm* — Oliff PLC

(57) ABSTRACT

There is provided a vehicle front section structure including: a pair of front side members that extend in a vehicle front-rear direction; a cross member extending between the front side members; outriggers that are provided running in the vehicle front-rear direction at a vehicle upper side of the front side members, with each of the outriggers extending toward a corresponding front side member at a vehicle front side; joining members that are each joined to a corresponding front side member, the cross member, and a corresponding outrigger; and a suspension member that is fixed to a fixing portion provided at each joining member.

7 Claims, 8 Drawing Sheets

VEHICLE FRONT SECTION STRUCTURE

CROSS-REFERENCE TO RELATED APPLICATION

This application is based on and claims priority under 35 USC 119 from Japanese Patent Application No. 2017-104789 filed on May 26, 2017, the disclosure of which is incorporated by reference herein.

BACKGROUND

Technical Field

The present disclosure relates to a vehicle front section structure.

Related Art

Japanese Patent No. 5958706 describes a vehicle front section structure including plural cross members (a second cross member to a fourth cross member) that couple between side members in a vehicle width direction at the vehicle rear side of a front end cross member that functions as bumper reinforcement. This vehicle front section structure further includes deformation-suppressing frames between the pair of side members and the second cross member, and between the third cross member and the fourth cross member. This enables load applied to the side members to be dispersed and suppressed.

Namely, the vehicle front section structure described in Japanese Patent No. 5958706 improves collision-withstand performance by joining together structural members, specifically the plural side members and the deformation-suppressing frames.

However, although the vehicle front section structure of Japanese Patent No. 5958706 improves collision-withstand performance, there is an increase in the number of joints between the respective structural members. In particular, since the number of joints at the side members increases, there is room for improvement from the perspective of securing a crushing stroke.

SUMMARY

In consideration of the above circumstances, an object of the present disclosure is to provide a vehicle front section structure capable of securing a crushing stroke while also securing collision-withstand performance, by consolidating joints between structural members.

A vehicle front section structure according to a first aspect of the present disclosure includes a pair of front side members, a cross member, outriggers, joining members, and a suspension member. The cross member extends between the front side members. The outriggers are provided running in the vehicle front-rear direction at a vehicle upper side of the front side members. Each of the outriggers extends toward a corresponding front side member at a vehicle front side. The joining members are each joined to a corresponding front side member, the cross member, and a corresponding outrigger. The suspension member is fixed to a fixing portion provided at each joining member.

The vehicle front section structure according to the first aspect is provided with the joining members that are joined to the front side members, the cross member, and the outriggers. The suspension member is also fixed to the joining members. Namely, the joining members consolidate joins with the front side members, the cross member, the outriggers, and the suspension member. Note that the fixing portion to which the suspension member is fixed corresponds, for example, to a threaded portion to which a bolt is fixed. In the vehicle front section structure according to the first aspect, the joints with various structural members configuring the vehicle are consolidated at a fixing location of the suspension member, where there is dead stroke in a collision. This enables collision load to be dispersed into the respective structural members, thereby securing collision-withstand performance. Moreover, crushing stroke can also be secured by reducing the number of joints with the respective structural members.

In a vehicle front section structure according to a second aspect of the present disclosure, the joining members are configured by die-cast aluminum.

The vehicle front section structure according to the second aspect enables both high strength and low weight to be achieved by employing die-cast aluminum joining members.

In a vehicle front section structure according to a third aspect of the present disclosure, each of the joining members includes tube-shaped insertion portions at a vehicle front side and at a vehicle rear side, respectively. Moreover, each of the insertion portions include a front joint at the vehicle front side to which a column-shaped crash box is joined in a state in which the crash box is inserted into the front joint, and a rear joint at the vehicle rear side to which a corresponding front side member is joined in a state in which the front side member is inserted into the rear joint.

The vehicle front section structure according to the third aspect relates to a vehicle front section structure in which column-shaped crash boxes are connected to the joining members. In the vehicle front section structure of the third aspect, the structural members are joined to the insertion portions provided at the joining member in a state in which the respective structural member is inserted into a corresponding insertion portion, thereby enabling the joint rigidity of the structural members to be increased. Providing both an insertion portion that is open at the vehicle front side and an insertion portion that is open at the vehicle rear side at each joining member of the vehicle front section structure enables the joining positions of the structural members to be adjusted in the vehicle front-rear direction.

In a vehicle front section structure according to a fourth aspect of the present disclosure, each of the joining members includes tube-shaped insertion portions at a vehicle upper side and at a vehicle width direction inner side, respectively. Moreover, each of the insertion portions include an upper joint at the vehicle upper side, to which a corresponding outrigger is joined in a state in which the outrigger is inserted into the upper joint, and a side joint at the vehicle width direction inner side, to which the cross member is joined in a state in which the cross member is inserted into the side joint.

In the vehicle front section structure according to the fourth aspect, the structural members are joined to the insertion portions provided at the joining member in a state in which the respective structural member is inserted into a corresponding insertion portion, thereby enabling the joint rigidity of the structural members to be increased. Providing both an insertion portion that is open at the vehicle upper side and an insertion portion that is open at the vehicle width direction inner side to each joining member of the vehicle front section structure enables the joining positions of the structural members to be adjusted in the vehicle vertical direction or the vehicle width direction.

The present disclosure is capable of providing a vehicle front section structure capable of securing a crushing stroke while also securing collision-withstand performance, by consolidating joints between structural members.

BRIEF DESCRIPTION OF DRAWINGS

Exemplary embodiments of the present disclosure will be described in detail based on the following figures, wherein.

DETAILED DESCRIPTION

Figure 1:
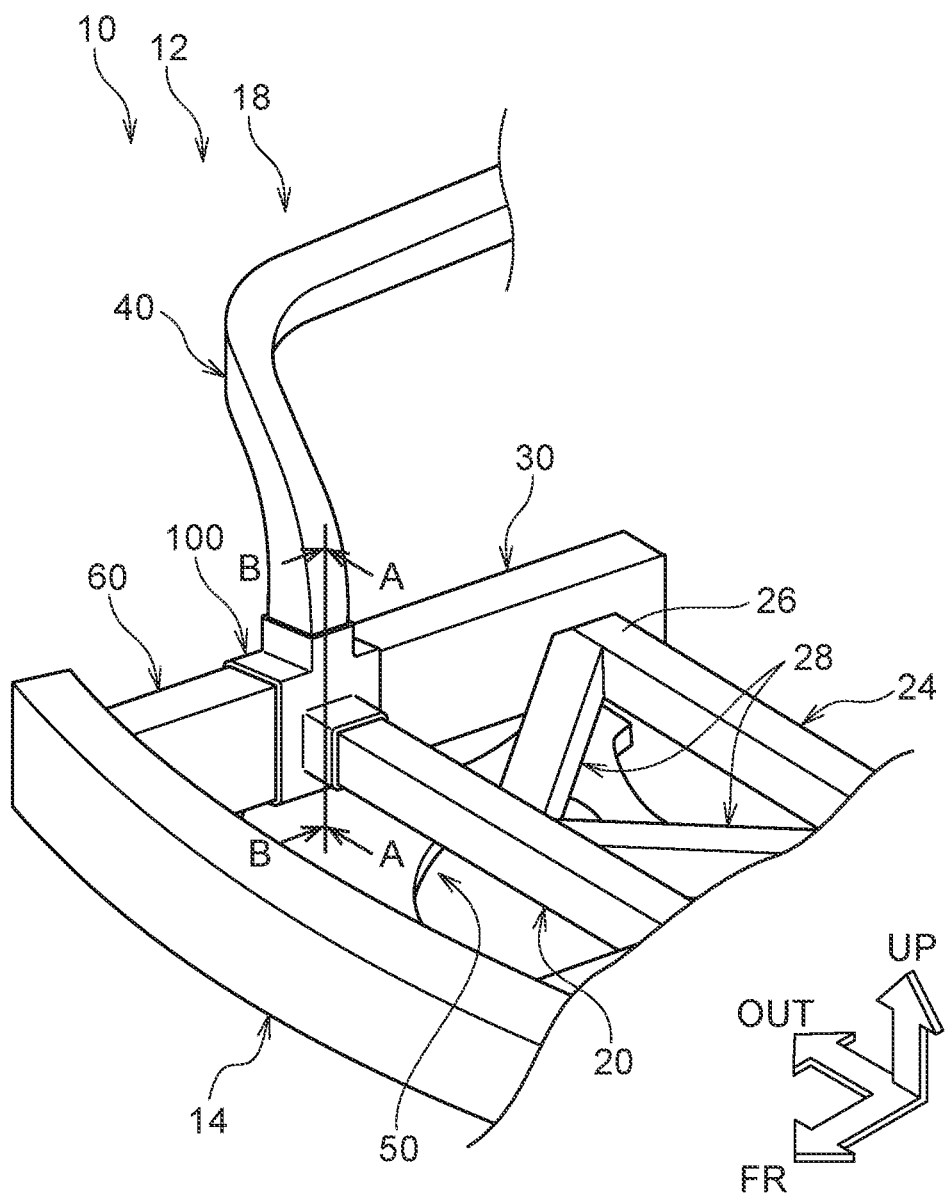
FIG. 1 is a perspective view illustrating a front section of a vehicle applied with a vehicle front section structure according to an exemplary embodiment of the present disclosure, as viewed looking down from the vehicle width direction inner side from in front of the vehicle.

Explanation follows regarding a vehicle front section structure according to an exemplary embodiment of the present disclosure, with reference to FIG. 1 to FIG. 5. Note that in the drawings, arrow FR points toward the vehicle front side, arrow UP points toward the vehicle upper side, and arrow OUT points toward a vehicle width direction outer side. A front section of the vehicle is configured with basic left-right symmetry, and so the explanation and illustrations focus on the right of the vehicle.

Basic Configuration

Figure 2:
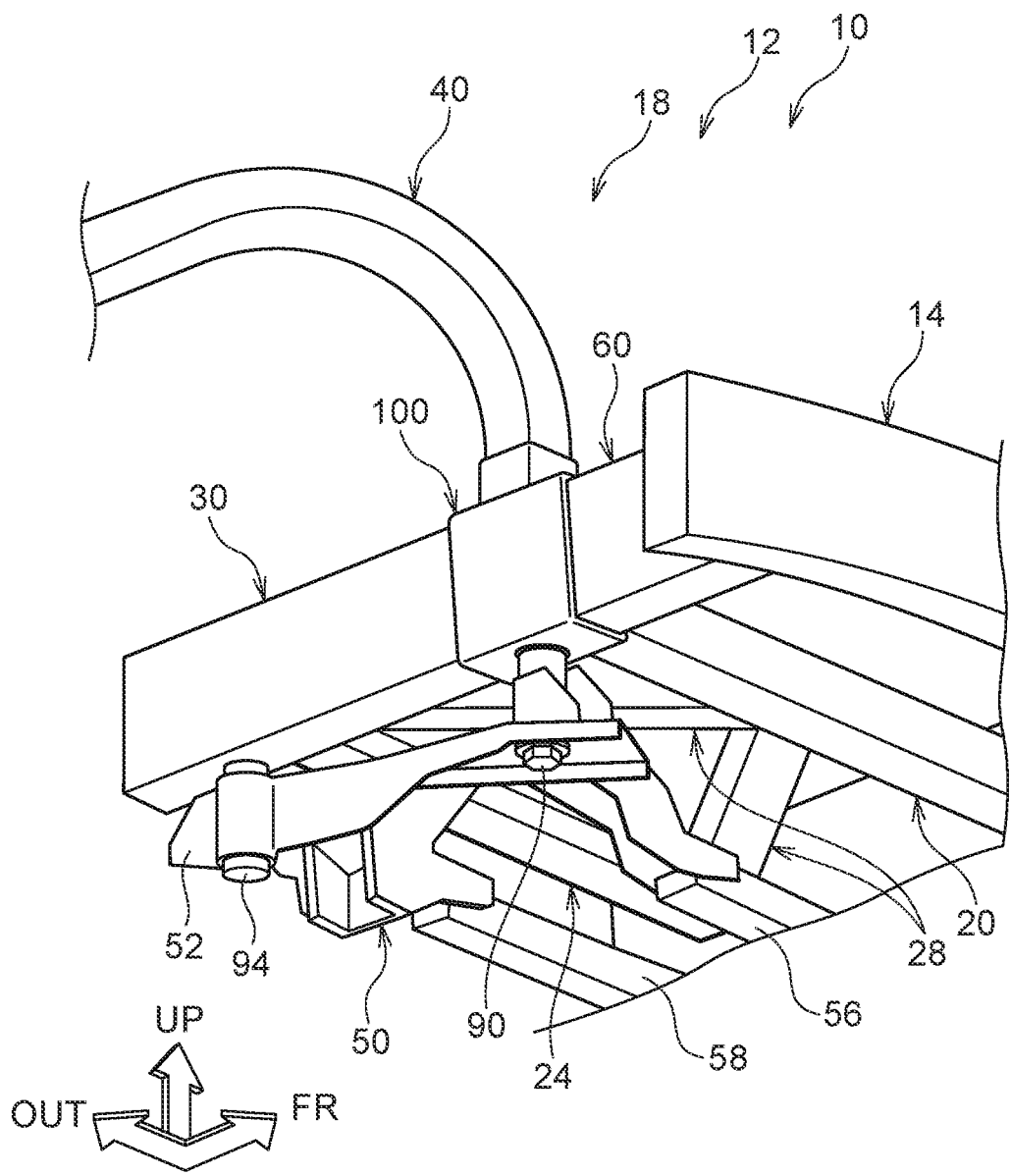
FIG. 2 is a perspective view illustrating a front section of a vehicle applied with a vehicle front section structure according to an exemplary embodiment of the present disclosure, as viewed looking up from the vehicle width direction outer side from in front of the vehicle.

FIG. 1 and FIG. 2 illustrate a front section 12 of a vehicle 10 applied with a vehicle front section structure 18. The front section 12 of the vehicle 10 is provided with a pair of front side members 30 running in a vehicle front-rear direction. Vehicle front end portions of the front side members 30 are respectively provided with substantially box-shaped joining members 100. Each joining member 100 is connected to the front side member 30, serving as a structural member, and is also connected to a front cross member 20, an outrigger (apron member) 40, a suspension member 50, and a crash box 60.

Figure 3:
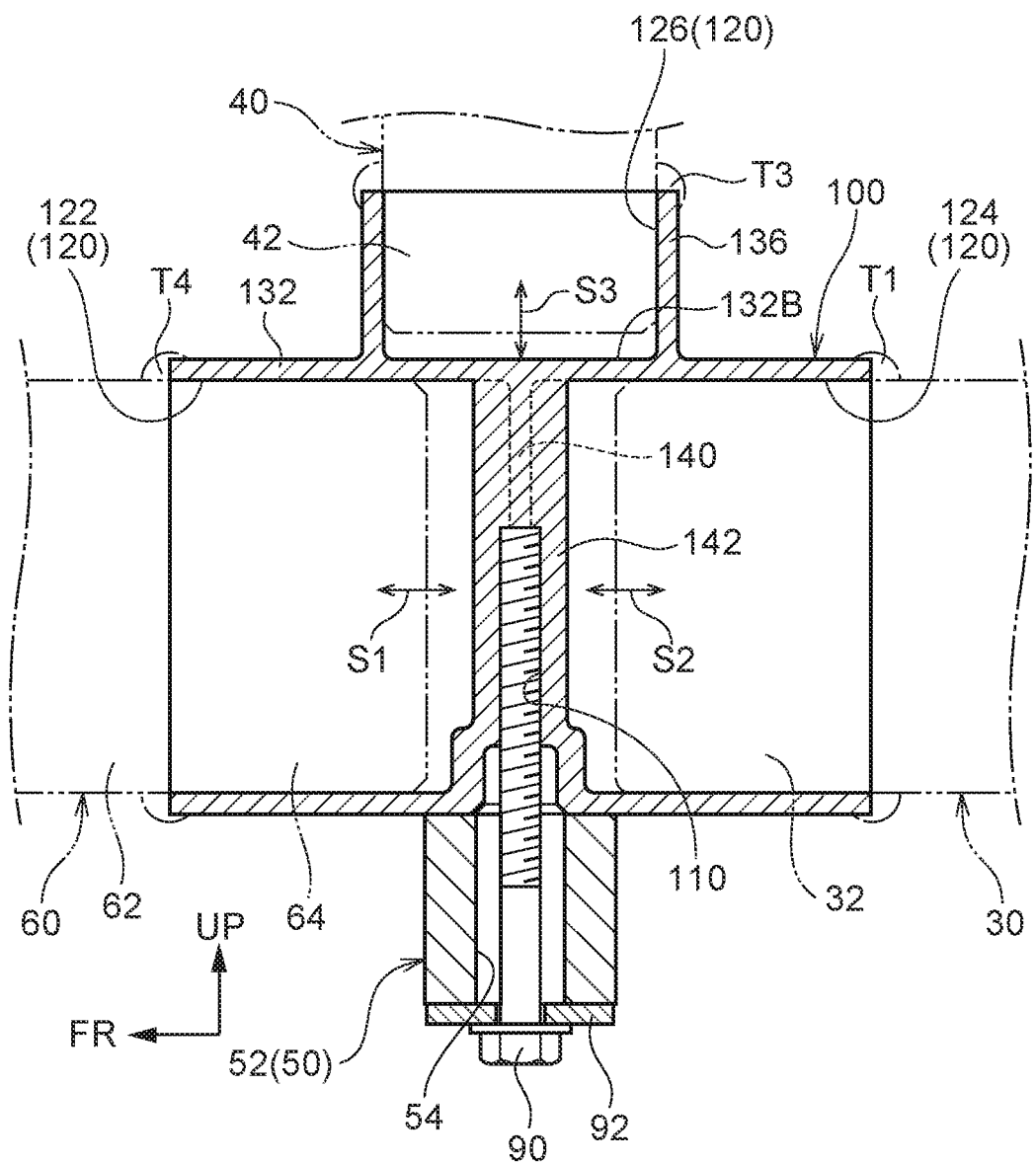
FIG. 3 is a side view cross-section (a cross-section along A-A in FIG. 1) illustrating a joined state of a joining member according to an exemplary embodiment of the present disclosure.
Figure 4:
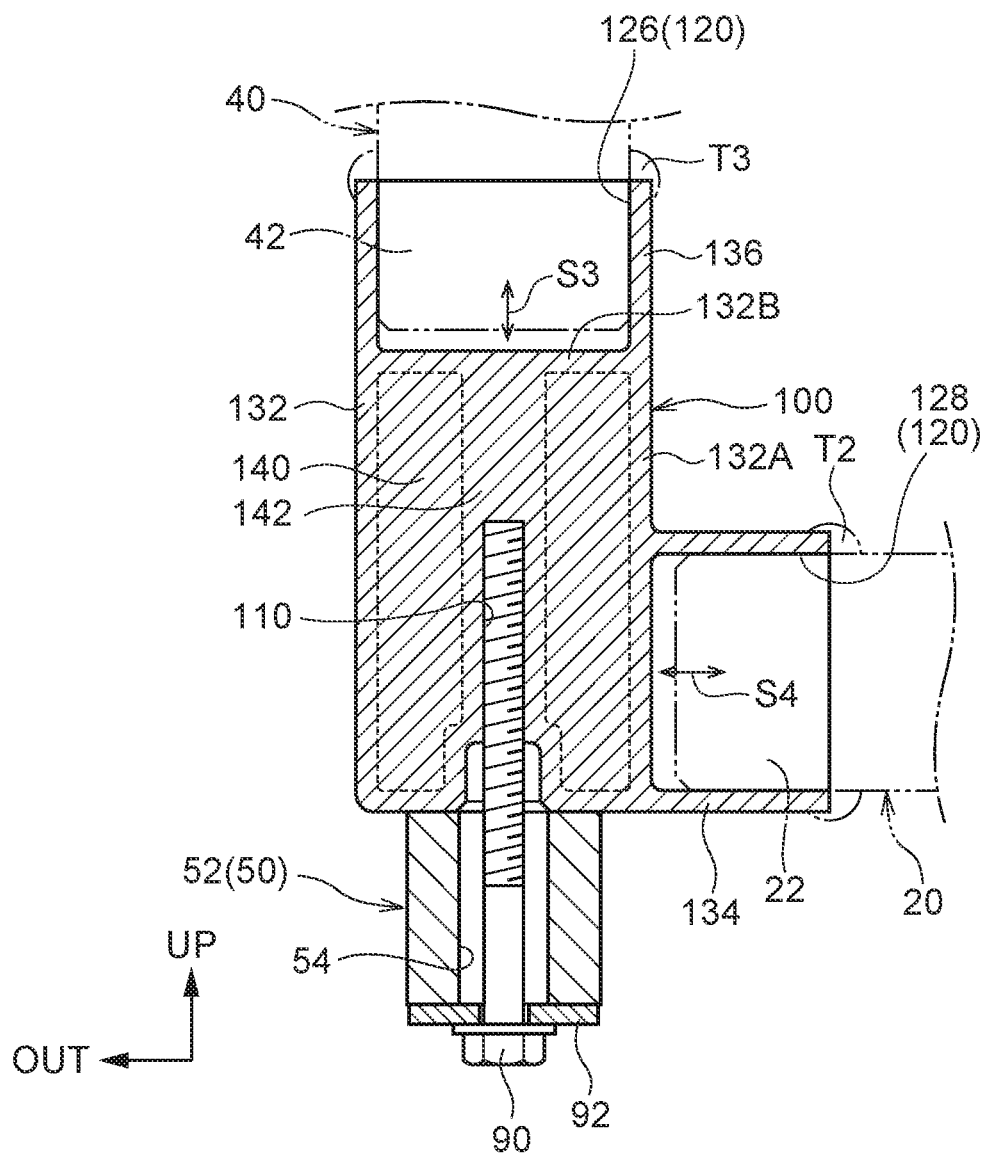
FIG. 4 is a front view cross-section (a cross-section along B-B in FIG. 1) illustrating a joined state of a joining member according to an exemplary embodiment of the present disclosure.

The joining members 100 are structural members cast from aluminum (specifically die-cast aluminum), and include tube-shaped insertion portions 120 at the vehicle front side, vehicle rear side, vehicle upper side, and vehicle width direction inner side. As illustrated in FIG. 3, the insertion portions 120 include a front joint 122 at the vehicle front side, and a rear joint 124 at the vehicle rear side. Moreover, a threaded portion 110, serving as a fixing portion into which a bolt 90, described later, is screwed, is provided at the vehicle lower side of the joining member 100. As illustrated in FIG. 4, the insertion portions 120 also include an upper joint 126 at the vehicle upper side, and a side joint 128 at the vehicle width direction inner side. The structure of the joining member 100 will be described in detail later.

As illustrated in FIG. 1 and FIG. 2, the front side members 30 have a closed cross-section structure and are provided running in the vehicle front-rear direction on both vehicle width direction sides of the front section 12 of the vehicle 10. As illustrated in FIG. 3, a front end portion 32, configuring a vehicle front end portion of the front side member 30, is joined to the rear joint 124 of each joining member 100 in a state inserted into the rear joint 124. A weld T1 is formed at the join of each front side member 30 by arc welding around the entire periphery of a step formed between a vehicle rear end face of the rear joint 124 and an outer peripheral face of the front end portion 32. Note that the front side members 30 may be joined to the joining members 100 by fastening with bolts instead of by welding, or in addition to welding.

As illustrated in FIG. 1 and FIG. 2, the front cross member 20 and a rear cross member 24, serving as cross members with closed cross-section structures, are provided running along the vehicle width direction between the pair of front side members 30 at the front section 12 of the vehicle 10. As illustrated in FIG. 4, an outer end portion 22, this being a vehicle width direction outer end portion of the front cross member 20, is joined to the side joint 128 of the joining member 100 in a state inserted into the side joint 128. A weld T2 is formed at the join of the front cross member 20 by arc welding around the entire periphery of a step formed between a vehicle width direction inner end face of the side joint 128 and an outer peripheral face of the outer end portion 22. Note that the front cross member 20 may be joined to the joining members 100 by fastening with bolts instead of by welding, or in addition to welding.

Moreover, as illustrated in FIG. 1, outer end portions 26 of the rear cross member 24, these being vehicle width direction outer end portions of the rear cross member 24 positioned at the vehicle rear side of the front cross member 20, are joined to the front side members 30 by welding or the like. A pair of coupling members 28 are provided from a vehicle width direction central portion of the front cross member 20 toward the outer end portions 26 of the rear cross member 24.

As illustrated in FIG. 1 and FIG. 2, the outriggers 40, these being apron members with a closed cross-section structure, are provided running in the vehicle front-rear direction at the vehicle upper side of the front side members 30 at vehicle width direction outer sides of the front section 12 of the vehicle 10. At the vehicle front side, the outriggers 40 extend so as to curve toward the vehicle lower side on progression toward the vehicle front side. As illustrated in FIG. 3 and FIG. 4, a lower end portion 42, this being a vehicle lower side end portion of the outrigger 40, is joined to the upper joint 126 of the joining member 100 in a state inserted into the upper joint 126. A weld T3 is formed at the join of the outrigger 40 by arc welding around the entire periphery of a step formed between a vehicle upper end face of the upper joint 126 and an outer peripheral face of the lower end portion 42. Note that the outriggers 40 may be joined to the joining members 100 by fastening with bolts instead of by welding, or in addition to welding.

As illustrated in FIG. 1 and FIG. 2, the column-shaped crash box 60 is provided at the vehicle front side of each front side member 30. An axial center of the front side member 30 and an axial center of the crash box 60 are aligned or substantially aligned with each other. The crash boxes 60 of the present exemplary embodiment each include a body 62 with a closed cross-section structure, a flange (not illustrated in the drawings) formed at a vehicle front end portion of the body 62, and a rear end portion 64, this being a portion at the vehicle rear end (see FIG. 3). Moreover, as illustrated in FIG. 3, the rear end portion 64 of the crash box 60 is joined to the front joint 122 of the joining member 100 in state inserted into the front joint 122. A weld T4 is formed at the join of the crash box 60 by arc welding around the entire periphery of a step formed between a vehicle front end face of the front joint 122 and an outer peripheral face of the rear end portion 64. Note that the crash box 60 may be joined to the joining members 100 by fastening with bolts instead of by welding, or in addition to welding.

As illustrated in FIG. 1 and FIG. 2, the front end portion section of the vehicle 10 is provided with a bumper reinforcement 14 connected to the flanges (not illustrated in the drawings) formed at the vehicle front side of the crash boxes 60. The bumper reinforcement 14 is disposed with its length direction running in the vehicle width direction. Note that although not illustrated in the drawings, an absorber (namely, a shock absorber) configured from a foamed body or the like is attached to a front face of the bumper reinforcement 14. The absorber and the bumper reinforcement 14 are covered by a bumper cover.

The suspension member 50 that supports a front suspension or the like, not illustrated in the drawings, is provided at the vehicle lower side of the front side members 30 at the front section 12 of the vehicle 10. The suspension member 50 includes a pair of left and right suspension member sides 52 that respectively support left and right front suspensions, and suspension cross members 56, 58 that couple the left and right suspension member sides 52 together in the vehicle width direction. Note that the method used to join together the suspension member sides 52 and the suspension cross members 56, 58 may be fastening using nuts and bolts, or may be welding such as spot welding or laser welding. A joining method employing an adhesive may also be adopted in the case of a resin body.

The suspension member 50 of the present exemplary embodiment is fixed to the joining members 100 and the front side members 30 at the suspension member sides 52, using bolts 90, 94. Specifically, at the vehicle front side, the bolt 90 is inserted through a washer 92, and is fixed to the joining member 100 by being inserted into an insertion hole 54 in the suspension member side 52 and fastened to the threaded portion 110 of the joining member 100 (see FIG. 3 and FIG. 4). Moreover, at the vehicle rear side, the bolt 94 is inserted through an insertion hole, not illustrated in the drawings, in a corresponding front side member 30, and is fixed to the front side member 30 by being fastened to a threaded portion, not illustrated in the drawings, provided at a vehicle lower portion of the front side member 30.

Joining Member

Figure 5:
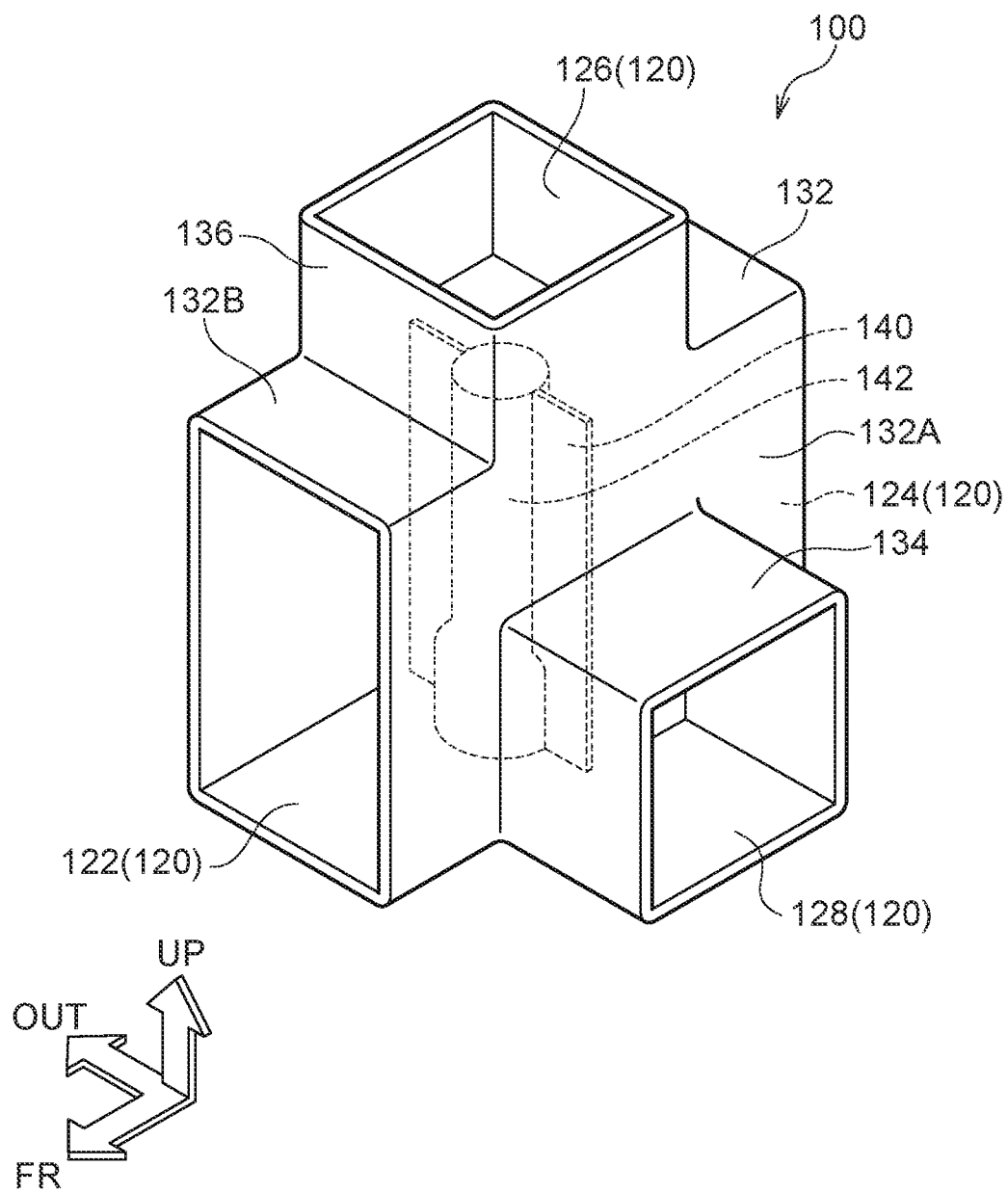
FIG. 5 is a perspective view illustrating the external appearance of a joining member according to an exemplary embodiment of the present disclosure.

As illustrated in FIG. 5, each joining member 100 includes a rectangular tube-shaped first tube-shaped portion 132 provided running along the vehicle front-rear direction, and a rectangular tube-shaped second tube-shaped portion 134 extending toward the vehicle width direction inner side from a side wall 132A on the vehicle width direction inner side of the first tube-shaped portion 132. Each joining member 100 also includes a rectangular tube-shaped third tube-shaped portion 136 extending toward the vehicle upper side from an upper wall 132B on the vehicle upper side of the first tube-shaped portion 132. Note that the second tube-shaped portion 134 and the third tube-shaped portion 136 are connected to a vehicle front-rear direction central portion of the first tube-shaped portion 132. A dividing wall 140, configured by a vertical rib partitioning a communication portion of the first tube-shaped portion 132 into vehicle front and vehicle rear sections, is provided at the vehicle front-rear direction central portion at the inner peripheral side of the first tube-shaped portion 132. A vehicle width direction central portion of the dividing wall 140 configures a column-shaped portion 142 that has increased thickness. The threaded portion 110 is formed from a vehicle lower side of the column-shaped portion 142 toward the upper side.

As illustrated in FIG. 3 and FIG. 4, an opening at the vehicle front side of the first tube-shaped portion 132 of the joining member 100 functions as the front joint 122, and an opening at the vehicle rear side of the first tube-shaped portion 132 of the joining member 100 functions as the rear joint 124. An opening at the vehicle width direction inner side of the second tube-shaped portion 134 of the joining member 100 functions as the side joint 128, and an opening at the vehicle upper side of the third tube-shaped portion 136 functions as the upper joint 126.

In the joining members 100 of the present exemplary embodiment, each insertion portion 120 has a shape that is open at one end and closed at the other end. Specifically, the dividing wall 140 partitions the front joint 122 from the rear joint 124, the side wall 132A partitions off the side joint 128, and the upper wall 132B partitions off the upper joint 126. Namely, rigidity of the joining member 100 of the present exemplary embodiment is secured by the partitions provided at the other end of each insertion portion 120.

Next, explanation follows regarding operation and advantageous effects of the present exemplary embodiment.

As illustrated in FIG. 1 and FIG. 2, in the present exemplary embodiment, the front side members 30, the front cross member 20, the outriggers 40, the suspension member 50, and the crash boxes 60 are connected to the respective joining members 100 on the left and right in the vehicle width direction. The bumper reinforcement 14 is connected to the vehicle front end portions of the crash boxes 60. The vehicle front section structure 18 of the present exemplary embodiment exhibits the following operation and advantageous effects.

Crushing Stroke

Figure 6:
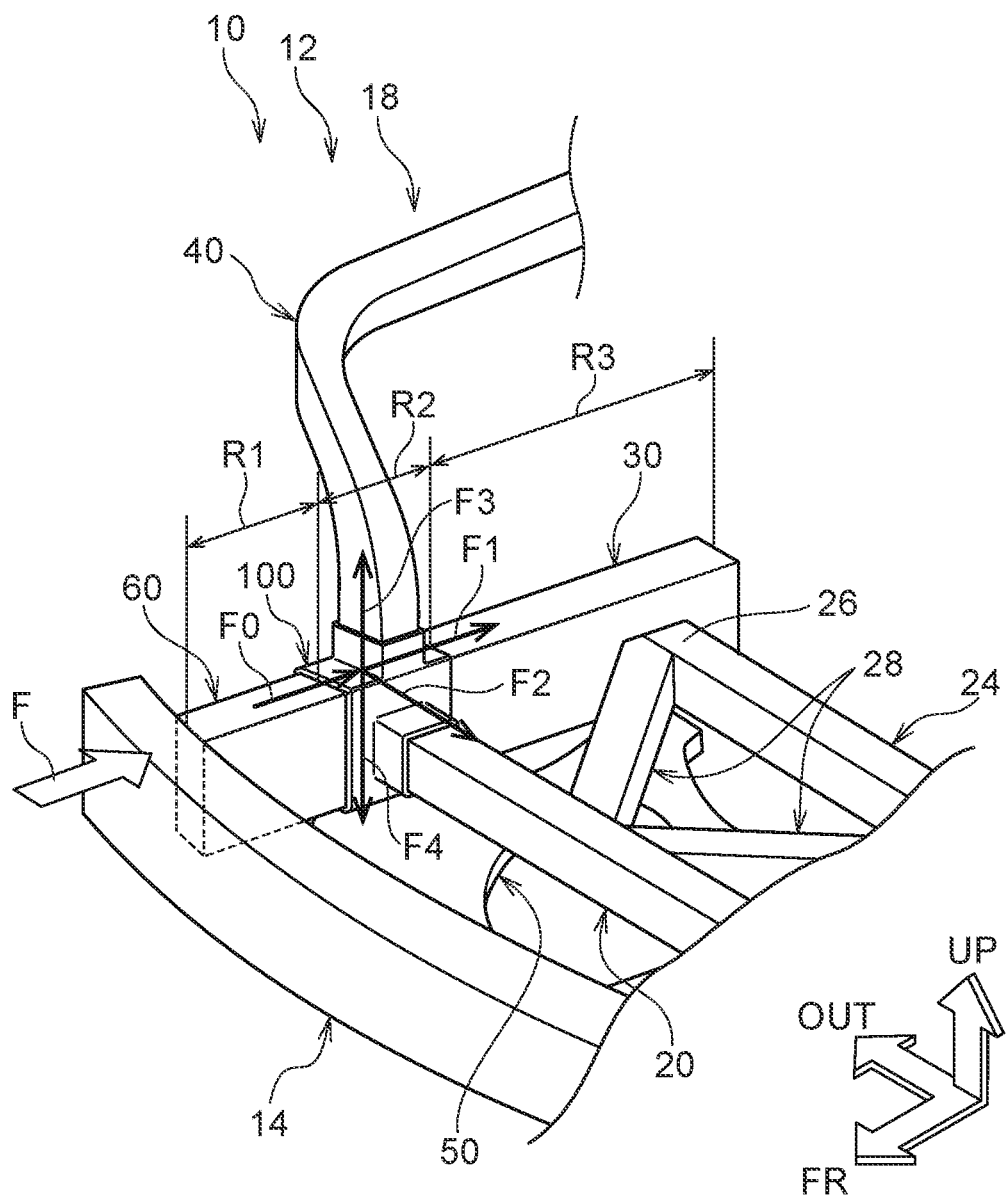
FIG. 6 is a diagram to explain operation of a vehicle front section structure according to an exemplary embodiment of the present disclosure.

As described above, in the vehicle front section structure 18 of the present exemplary embodiment, the axial center of the front side member 30 and the axial center of the crash box 60 are aligned or substantially aligned with each other. Accordingly, in the vehicle front section structure 18 of the present exemplary embodiment, the front side member 30, the joining member 100, and the crash box 60 are disposed in a mutually connected state running along the vehicle front-rear direction. Note that since the joining member 100 of the present exemplary embodiment configures a fixing location of the suspension member 50, the joining member 100 has higher rigidity than the front side member 30 and the crash box 60. Accordingly, as illustrated in FIG. 6, as viewed along the vehicle front-rear direction, the joining member 100 that is located in a region R2 is a location that is not crushed in a vehicle frontal collision (namely, corresponding to the dead stroke).

In the present exemplary embodiment, not only the front side member 30 and the crash box 60, but also the front cross member 20 and the outrigger 40 are joined to the joining member 100. The front side member 30 and the crash box 60 are not provided with joints with other structural members (specifically the front cross member 20, the outrigger 40, and the suspension member 50). Namely, there is no location in the vehicle front-rear direction other than at the joining member 100 where there is dead stroke in a collision. In the present exemplary embodiment, as viewed along the vehicle front-rear direction, the crash box 60 located in a region R1 and the front side member 30 located in a region R3 can be secured as locations that are crushed (namely, where a crushing stroke is secured) in a vehicle frontal collision.

The vehicle front section structure 18 of the present exemplary embodiment enables joints with structural members configuring the front section 12 of the vehicle 10 to be consolidated at the joining members 100, this being a fixing location of the suspension member 50. This thereby enables as much crushing stroke as possible to be secured in a vehicle frontal collision.

Adjustment of Joining Positions

In a related vehicle front section structure, structural members are joined together using flanges. Since joint rigidity is difficult to secure at flange joints, this presents a weakness in collision-withstand performance. Moreover, with flange joints, it is difficult to mate joining faces, making join positions difficult to adjust. However, in the vehicle front section structure 18 of the present exemplary embodiment, each joining member 100 configures a node (namely, at the joints), and the respective structural members are inserted into and joined to the joining members 100. Specifically, structural members having closed cross-section structures are inserted into the respective insertion portions 120 provided at the joining member 100, and then joined thereto by welding seams between the joining member 100 and the respective structural members. The joining method of the present exemplary embodiment thus enables the joint rigidity of the joints to be increased in comparison to flange joints.

The joining method of the present exemplary embodiment has the following characteristics. Namely, at the front joint 122 into which the rear end portion 64 of the crash box 60 is inserted, the vehicle front-rear direction joining position (arrow S1 in FIG. 3) can be adjusted by adjusting the insertion amount of the rear end portion 64 into the front joint 122. At the rear joint 124 into which the front end portion 32 of the front side member 30 is inserted, the vehicle front-rear direction joining position (arrow S2 in FIG. 3) can be adjusted by adjusting the insertion amount of the front end portion 32 into the rear joint 124. Moreover, at the upper joint 126 into which the lower end portion 42 of the outrigger 40 is inserted, the vehicle vertical direction joining position (arrow S3 in FIG. 4) can be adjusted by adjusting the insertion amount of the lower end portion 42 into the upper joint 126. Moreover, at the side joint 128 into which the outer end portion 22 of the front cross member 20 is inserted, the vehicle width direction joining position (see arrow S4 in FIG. 4) can be adjusted by adjusting the insertion amount of the outer end portion 22 into the side joint 128.

As described above, the vehicle front section structure 18 of the present exemplary embodiment enables the joining positions to be adjusted by adjusting the insertion amounts of the structural members inserted into the respective insertion portions 120. Adjustment of the joining positions is therefore simpler than when using flange joints, as in related technology.

Load Dispersion

In the joining member 100 of the present exemplary embodiment described above, connections of the front side member 30, the front cross member 20, the outrigger 40, the suspension member 50, and the crash box 60 are consolidated. Collision load F arising in a frontal collision of the vehicle 10 is accordingly transmitted in the following manner, as illustrated in FIG. 6.

First, the collision load F in a frontal collision of the vehicle 10 is transmitted from the bumper reinforcement 14 as load F0 dispersed between the crash boxes 60 on the left and right in the vehicle width direction, and is input from the crash boxes 60 to the respective joining members 100. The load F0 input to the joining members 100 is transmitted to the front side members 30 as vehicle rear direction load F1, transmitted to the front cross member 20 as vehicle width direction inward load F2, transmitted to the outriggers 40 as vehicle upward load F3, and transmitted to the suspension member 50 as vehicle downward load F4. As described above, the collision load F received in a frontal collision of the vehicle 10 is dispersed in the four directions corresponding to the front side members 30, the front cross member 20, the outriggers 40, and the suspension member 50. Namely, the vehicle front section structure 18 of the present exemplary embodiment is capable of dispersing load into multiple structural members in a collision, thereby enabling collision-withstand performance to be secured. Note that in the present exemplary embodiment, employing the die-cast aluminum joining members 100 enables both high strength and low weight to be achieved.

Modified Examples

The joining members 100 of the present exemplary embodiment described above are integrally formed die-cast aluminum members. However, there is no limitation to forming by this method. Explanation follows regarding modified examples with multi-part structures. Note that in the modified examples, configurations that are the same as those of the joining member 100 of the present exemplary embodiment are allocated the same reference numerals.

Figure 7:
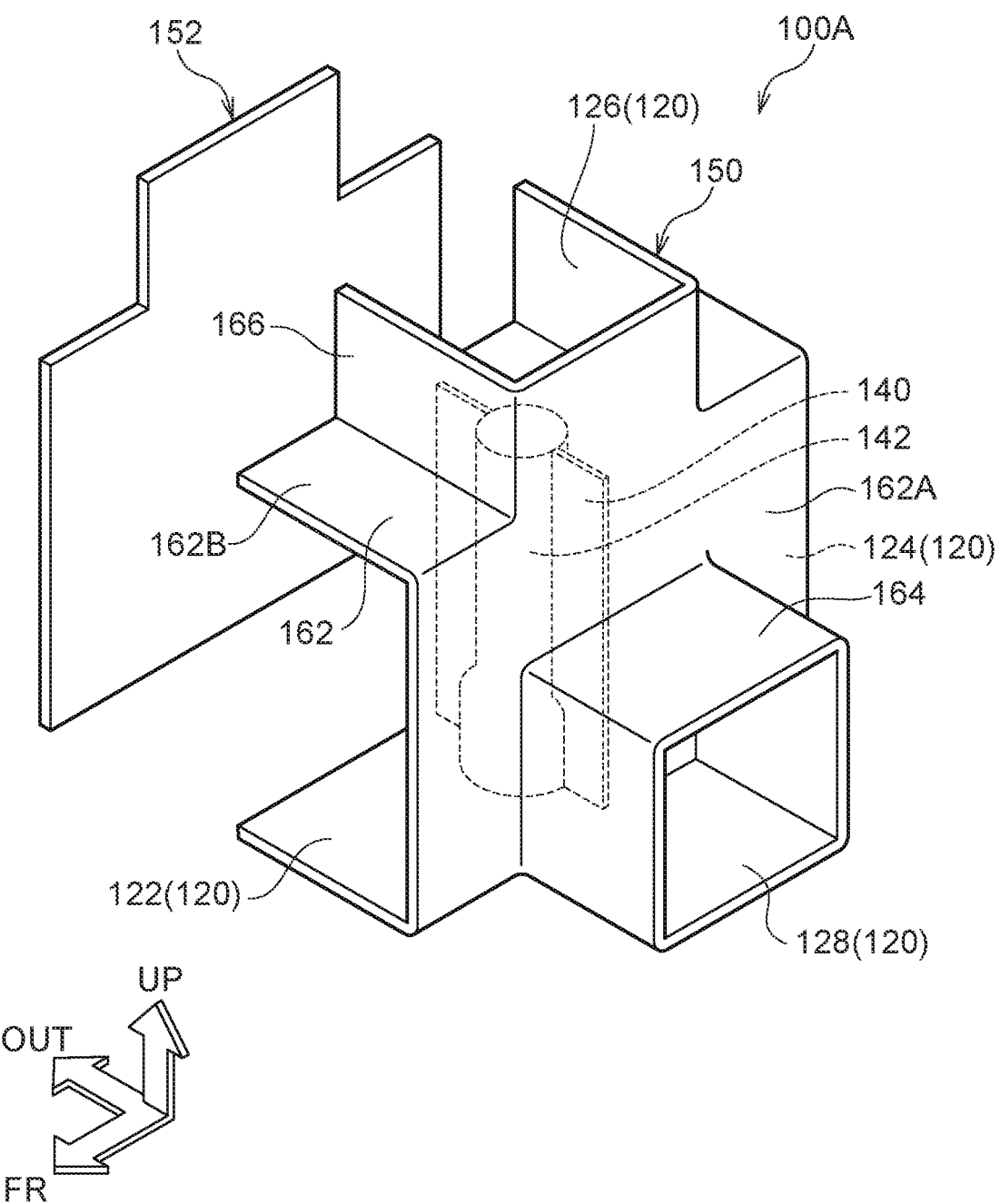
FIG. 7 is a perspective view illustrating the external appearance of a joining member according to a first modified example of an exemplary embodiment of the present disclosure.

FIG. 7 illustrates a joining member 100A of a first modified example. The joining member 100A is split into left and right in the vehicle width direction. The joining member 100A can be split into two in the vicinity of a vehicle width direction outer end portion. Specifically, the joining member 100A includes a body 150 that is open at a vehicle width direction outer face, and a cover 152 that covers the open portion of the body 150.

The body 150 includes a first enclosure 162 that is provided running in the vehicle front-rear direction and is enclosed at a vehicle width direction inner face, a vehicle upper face, and a vehicle lower face. The body 150 also includes a rectangular tube-shaped tube-shaped portion 164 extending from a side wall 162A on the vehicle width direction inner side of the first enclosure 162 toward the vehicle width direction inner side. The body 150 also includes a second enclosure 166 that extends from an upper wall 162B at the vehicle upper side of the first enclosure 162 toward the vehicle upper side, and that is enclosed at a vehicle width direction inner face, a vehicle front face, and a vehicle rear face. Note that the tube-shaped portion 164 and the second enclosure 166 are connected to a vehicle front-rear direction central portion of the first enclosure 162. A vehicle front-rear direction central portion of an inner peripheral side of the first enclosure 162 is provided with a dividing wall 140 provided perpendicular to the vehicle width direction inner face, the vehicle upper face, and the vehicle lower face of the first enclosure 162.

The cover 152 is a plate-shaped member with a projection portion at the vehicle upper side. The joining member 100A of the first modified example is formed by joining the cover 152 to the body 150 so as to cover the open portion at the vehicle width direction outer side of the body 150. Note that the method used to join the body 150 and the cover 152 may be an arc welding method, or a fastening method using bolts or the like.

An opening formed by the first enclosure 162 and the cover 152 at the vehicle front side of the joining member 100A of the first modified example functions as the front joint 122, and an opening formed at the vehicle rear functions as the rear joint 124. Moreover, an opening at the vehicle width direction inner side of the tube-shaped portion 164 of the joining member 100A functions as the side joint 128. Moreover, an opening formed by the second enclosure 166 and the cover 152 at the vehicle upper side of the joining member 100A functions as the upper joint 126.

Figure 8:
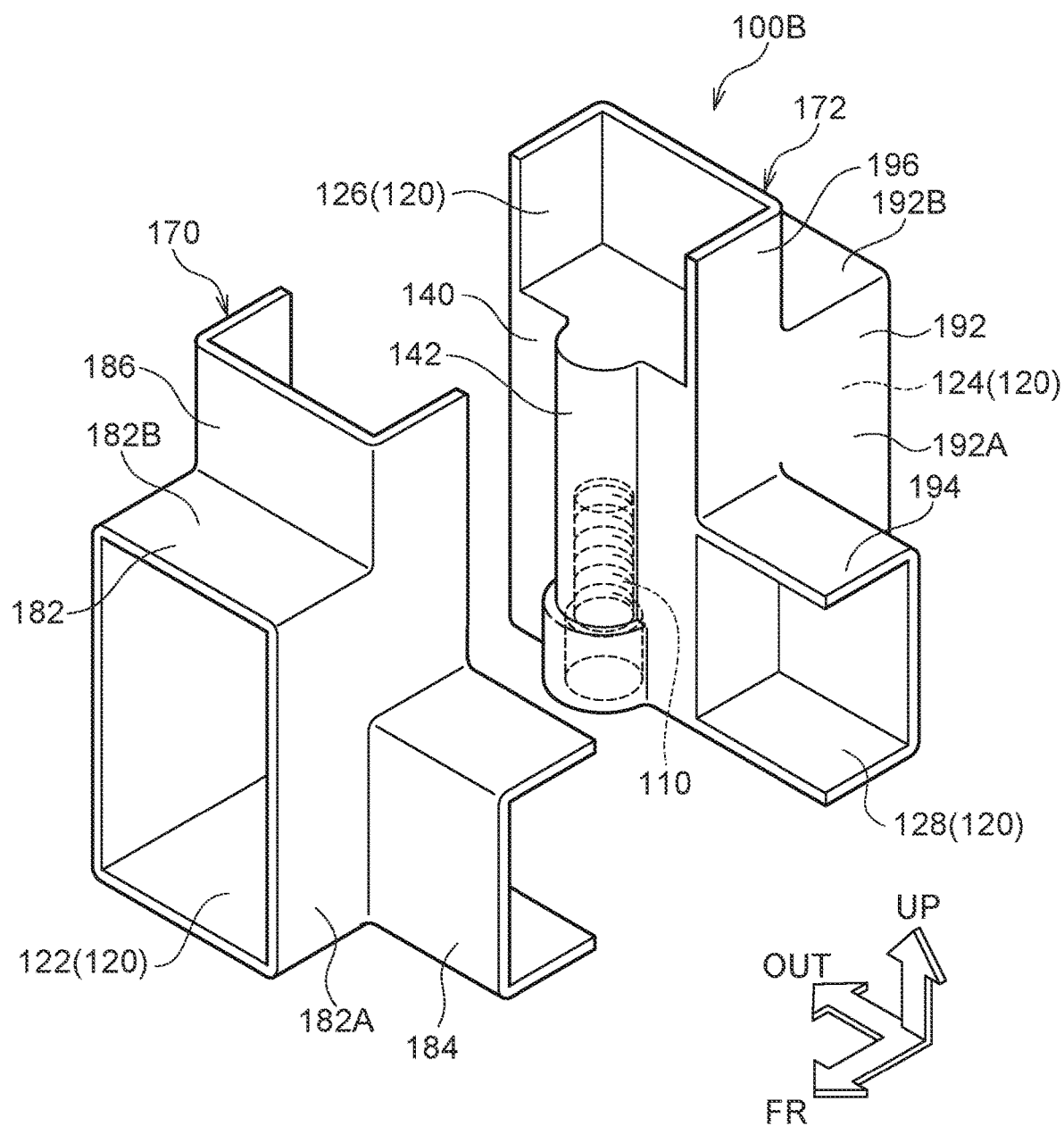
FIG. 8 is a perspective view illustrating the external appearance of a joining member according to a second modified example of an exemplary embodiment of the present disclosure.

FIG. 8 illustrates a joining member 100B of a second modified example. The joining member 100B is split to the front and rear in the vehicle front-rear direction. The joining member 100B is capable of being split into two in the vicinity of a vehicle front-rear direction central portion. Specifically, the joining member 100B includes a front portion 170 at the vehicle front side, and a rear portion 172 at the vehicle rear side.

The front portion 170 includes a rectangular tube-shaped first tube-shaped portion 182 provided running in the vehicle front-rear direction, and a first enclosure 184 that extends from a side wall 182A on the vehicle width direction inner side of the first tube-shaped portion 182 toward the vehicle width direction inner side, and that is enclosed at a vehicle front face, a vehicle upper face, and a vehicle lower face. The front portion 170 also includes a second enclosure 186 that extends from an upper wall 182B at the vehicle upper side of the first tube-shaped portion 182 toward the vehicle upper side, and that is enclosed at a vehicle front face, a vehicle width direction outer face, and a vehicle width direction inner face.

The rear portion 172 includes a rectangular tube-shaped second tube-shaped portion 192 provided running in the vehicle front-rear direction, and a third enclosure 194 that extends from a side wall 192A on the vehicle width direction inner side of the second tube-shaped portion 192 toward the vehicle width direction inner side, and that is enclosed at a vehicle rear face, a vehicle upper face, and a vehicle lower face. The rear portion 172 includes a fourth enclosure 196 that extends from an upper wall 192B at the vehicle upper side of the second tube-shaped portion 192 toward the vehicle upper side, and that is enclosed at a vehicle rear face, a vehicle width direction outer face, and a vehicle width direction inner face. The rear portion 172 also includes a dividing wall 140 that closes off the vehicle front of the second tube-shaped portion 192.

The joining member 100B of the second modified example is formed by abutting and joining together a vehicle rear end portion of the front portion 170 and a vehicle front end portion of the rear portion 172. Note that the method used to join the front portion 170 and the rear portion 172 may be an arc welding method or a fastening method using bolts or the like.

In the joining member 100B of the second modified example, an opening at the vehicle front side of the first tube-shaped portion 182 functions as the front joint 122, and an opening at the vehicle rear side of the second tube-shaped portion 192 functions as the rear joint 124. Moreover, an opening formed by the first enclosure 184 and the third enclosure 194 at the vehicle width direction inner side of the joining member 100B functions as the side joint 128. An opening formed by the second enclosure 186 and the fourth enclosure 196 at the vehicle upper side of the joining member 100B functions as the upper joint 126.

Supplement

The joining member 100 of the present exemplary embodiment and the joining members 100A, 100B of the modified examples are configured from die-cast aluminum. However, there is no limitation thereto. For example, the joining members may be cast using a metal other than aluminum. Moreover, the joining members may be integrally formed from a resin material in the case of a resin body.

Note that the positions of the splits in the modified examples above are merely examples, and split positions and splitting methods may be set freely.

What is claimed is:

1. A vehicle front section structure comprising:
   a pair of front side members that extend in a vehicle front-rear direction;
   a cross member extending between the front side members;
   outriggers that are provided running in the vehicle front-rear direction at a vehicle upper side of the front side members, with each of the outriggers extending toward a corresponding front side member at a vehicle front side;
   joining members that are each joined to a corresponding front side member, the cross member, and a corresponding outrigger in a state in which the corresponding front side member, the cross member and the corresponding outrigger are inserted into the joining member; and
   a suspension member that is fixed to a fixing portion provided at each joining member.

2. The vehicle front section structure of claim 1, wherein the joining members are configured by die-cast aluminum.

3. The vehicle front section structure of claim 1, wherein:
   each of the joining members includes tube-shaped insertion portions at a vehicle front side and at a vehicle rear side, respectively; and
   each of the insertion portions include:
   a front joint at the vehicle front side, to which a column-shaped crash box is joined in a state in which the crash box is inserted into the front joint, and
   a rear joint at the vehicle rear side, to which a corresponding front side member is joined in a state in which the front side member is inserted into the rear joint.

4. The vehicle front section structure of claim 3, wherein:
   a dividing wall that partitions the front joint from the rear joint is provided between the front joint and the rear joint; and
   the fixing portion is provided at the dividing wall.

5. The vehicle front section structure of claim 3, wherein each of the joining members includes:
   a body that is open at a vehicle width direction outer side; and
   a cover that covers an open portion of the body.

6. The vehicle front section structure of claim 3, wherein each of the joining members includes:

a front portion including the front joint; and
a rear portion including the rear joint.

7. The vehicle front section structure of claim 1, wherein:
each of the joining members includes tube-shaped insertion portions at a vehicle upper side and at a vehicle width direction inner side, respectively; and
each of the insertion portions include:
an upper joint at the vehicle upper side, to which a corresponding outrigger is joined in a state in which the outrigger is inserted into the upper joint, and
a side joint at the vehicle width direction inner side, to which the cross member is joined in a state in which the cross member is inserted into the side joint.

* * * * *